No. 776,405. PATENTED NOV. 29, 1904.
A. KOPPEL.
WAGON TRAIN.
APPLICATION FILED JUNE 16, 1904.
NO MODEL.
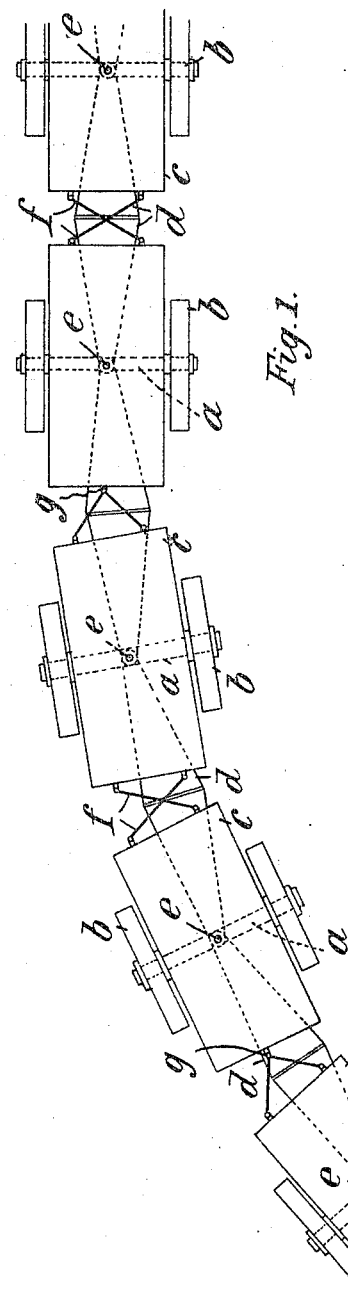
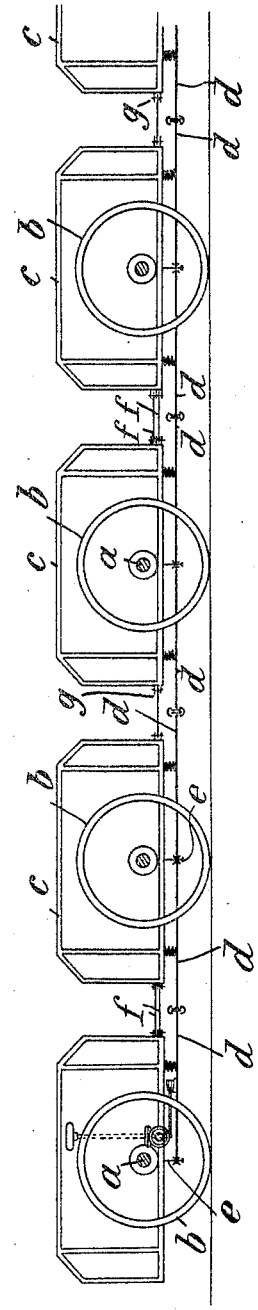
Witnesses
H. M. Kuhne
John A. Percival
Inventor
Arthur Koppel
by Richards
ATTORNEYS No. 776,405. Patented November 29, 1904.

UNITED STATES PATENT OFFICE.

ARTHUR KOPPEL, OF BERLIN, GERMANY.

WAGON-TRAIN.

SPECIFICATION forming part of Letters Patent No. 776,405, dated November 29, 1904.

Application filed June 16, 1904. Serial No. 212,878. (No model.)

*To all whom it may concern:*

Be it known that I, ARTHUR KOPPEL, manufacturer, of 45 Dorotheenstrasse, Berlin N. W. 7, Germany, have invented certain new and useful Improvements in Trains of Wagons, of which the following is a full, clear, and exact specification.

My invention relates to a train of wagons or the like which in order to economize the tractive force are provided with very large wheels of some five feet or more in diameter, but at the same time allow of the sharpest curves being turned without any space being lost owing to play having to be allowed the wheels. For this purpose the axle of each pair of wheels is rigidly connected with the body of the wagon in such manner as to form a rotary frame, main longitudinally-running connecting members extending from a central pin or pivot on one wagon to the like pivot of the next below the axles and bodies. This arrangement differs from prior wagons, whether with rotary frames with several axles connected with capability of turning or with single-axled rotary frames, where the main longitudinal connecting members and the coupling from wagon to wagon lie above, while the rotary frame is below.

One form of construction of the invention is shown in the accompanying diagrammatic drawings, in which—

Figure 1 is a plan of a train of wagons on a curve, and Fig. 2 an elevation of a like train.

The essential feature of the wagons here shown is that two pairs of wheels, with wagon-bodies, are connected, the necessary rigidity in a vertical plane being secured by the wagons mutually supporting each other. High wheels $b$ are mounted on the wagon-axle $a$, and each such axle carries a body $c$, but without the latter being able to turn relatively to it. $d$ is a system of rods running below the wagons from the central pivot $e$ of one wagon to that of the next. Thus each body $c$, with its axle $a$ secured rigidly to it, and wheels $b$, forms a rotary frame. In this manner despite the high wheels, which enable gradients, obstructions, &c., on ordinary roads to be overcome, a composite wagon—a train of wagons with a plurality of axles consisting of several such rotary frames—is obtained of amply sufficient turning capacity to take curves.

To insure the necessary rigidity in the vertical plane, the train illustrated is so constructed that each two neighboring rotary frames are connected by crossed rods $f$, so that a composite two-axled wagon is formed, the two parts of which support each other, and each such composite wagon is joined to the neighboring composite wagon by a simple connecting device $g$, admitting of turning. The first axle of the train to bring it into the curve is adjusted relatively to the rods $g$, either by hand or by the hauling-motor, so that the first rotary frame enters the curve, taking with it the wheels immediately dependent upon it, the succeeding composite wagons gradually following the curve. Experiments have shown that in this manner both gradual and sharp curves or bends in thoroughfares can be taken without rails.

Having thus described my invention, what I claim as new, and desire to secure by Letters Patent, is—

1. A train of wagons, each comprising a body, an axle rigidly secured thereto, two wheels mounted on the axle, and a central pivot and longitudinal members extending below the wagon-bodies from the central pivot of one wagon to that of the next, substantially as described.

2. A train of wagons, each comprising a body, an axle rigidly secured thereto, two wheels mounted on the axle, and a central pivot, and longitudinal members extending below the wagon-bodies from the central pivot of one wagon to that of the next, means connecting the said wagons in sets of two to form composite two-axled wagons with axles interdependent in their positions and members coupling each two adjacent composite wagons with capability of turning, substantially as described.

In witness whereof I have hereunto set my hand in presence of two witnesses.

ARTHUR KOPPEL.

Witnesses:
WOLDEMAR HAUPT,
HENRY HASPER.